United States Patent

[11] 3,603,928

| [72] | Inventors | Guido C. Speedy<br>Anderson, Ind.;<br>William T. Collins, Jr., Birmingham, Mich. |
|---|---|---|
| [21] | Appl No | 852,692 |
| [22] | Filed | Aug. 25, 1969 |
| [45] | Patented | Sept. 7, 1971 |
| [73] | Assignee | General Motors Corporation<br>Detroit, Mich. |

[54] PARKING, TURN SIGNAL, AND SIDE MARKER LAMP ASSEMBLY
3 Claims, 6 Drawing Figs.

[52] U.S. Cl. .................................................. 340/87,
240/8.1, 240/8.2, 240/8.4, 340/93, 340/100
[51] Int. Cl. ............................................ B60q 1/32,
G02I 17/00
[50] Field of Search....................................... 340/87, 89,
100, 93; 240/8.1, 8.2, 8.4

[56] References Cited
UNITED STATES PATENTS
1,903,462  4/1933  Knox ........................... 240/8.4

| 2,113,553 | 4/1938 | Dover | 340/93 |
| 3,456,153 | 7/1969 | Smith | 340/89 |

Primary Examiner—John W. Caldwell
Assistant Examiner—Howard S. Cohen
Attorneys—J. C. Carpenter and E. J. Biskup ABSTRACT: A multiple function motor vehicle lamp assembly includes a housing adapted to be attached to the vehicle, a light source carried by the housing, and a lens mounted on the housing in front of the light source and defining with the housing a lamp envelope. The light source includes two filaments, one of which is intermittently energized for providing a turn signal function and the other of which is steadily energized for providing a clearance or parking lamp function. An elongated mirror having a vertically disposed cylindrical reflecting surface is fixedly secured to an interior surface of the lens and intercepts and redirects a predetermined portion of the illumination projected by the steadily energized filament for providing a side marker lamp function.

PATENTED SEP 7 1971

INVENTORS
Guido C. Speedy, &
BY William J. Collins, Jr.

E. J. Biskup
ATTORNEY

PARKING, TURN SIGNAL, AND SIDE MARKER LAMP ASSEMBLY

Recently, legislation has been enacted requiring specific standards for motor vehicles such as passenger cars with regard to lamps and associated equipment which are used for signaling purposes and to enable operation of the vehicle in darkness and other situations of reduced visibility. Generally, these standards are directed toward three types of lighting units, turn signals which are used to indicate a change in vehicle direction by giving a flashing signal on the side of the vehicle toward which the turn will be made, parking lamps which give a visual indication of the overall width of the vehicle, and side marker lamps which serve to indicate the overall length of the vehicle.

Whereas previous lighting arrangements used multiple lamp assemblies for accomplishing the above noted lighting functions, the present invention utilizes a single lamp assembly and light bulb for signaling purposes. More specifically, a single light source having a pair of filaments is carried by a housing mounted at the outboard edges of the motor vehicle. One of the filaments is adapted to be intermittently energized to serve as a turn signal or hazard warning lamp. The other filament is adapted to be steadily energized to serve as a clearance or parking lamp. A transparent lens through which illumination from the light source is transmitted is secured to the housing in front of the filaments. An elongated mirror is fixedly vertically secured to the interior surface of the lens. The mirror has an arcuate reflecting surface which is adapted to intercept a portion of the illumination from the steadily energized filament and outwardly redirect the illumination for providing an integral side marker lamp function.

Accordingly, it is an objective of the present invention to provide a lamp assembly for a motor vehicle which has a single light source providing a plurality of lighting functions including that of the side marker lamp.

Another object of the present invention is to provide a multiple function motor vehicle lamp assembly wherein a light source is selectively energized for warning and clearance purposes and wherein a reflecting surface disposed interior of the lamp assembly intercepts a portion of the illumination from the light source and redirects the same laterally outwardly to provide side marker lamp illumination.

Still another object of the present invention is to provide a combination park and turn signal motor vehicle lamp assembly having an integral side marker lamp wherein a housing adapted to be mounted on the vehicle includes a transparent lens which is secured thereto to establish a lamp envelope in which a light source is located, the lens including a vertically disposed mirror having a cylindrical reflecting surface which is adapted to redirect a portion of the illumination from the light source laterally outwardly of the lamp assembly and the vehicle to provide side marker illumination.

A further object of the present invention is to provide a park, turn signal, and side marker lamp assembly wherein a single light bulb is disposed in a lamp envelope between a housing and a transparent lens, the light bulb having two filaments one of which is intermittently energized to project illumination for turn signal purposes and the other of which is steadily energized to project illumination for parking and clearance purposes with a portion thereof being reflected outwardly for side marker purposes by a cylindrical mirror mounted on an interior surface of the lens.

These and other objectives of the present invention will become readily apparent to one skilled in the art upon reading the following detailed description reference being made to the accompanying drawing illustrating a preferred embodiment in which.

Figure 1:
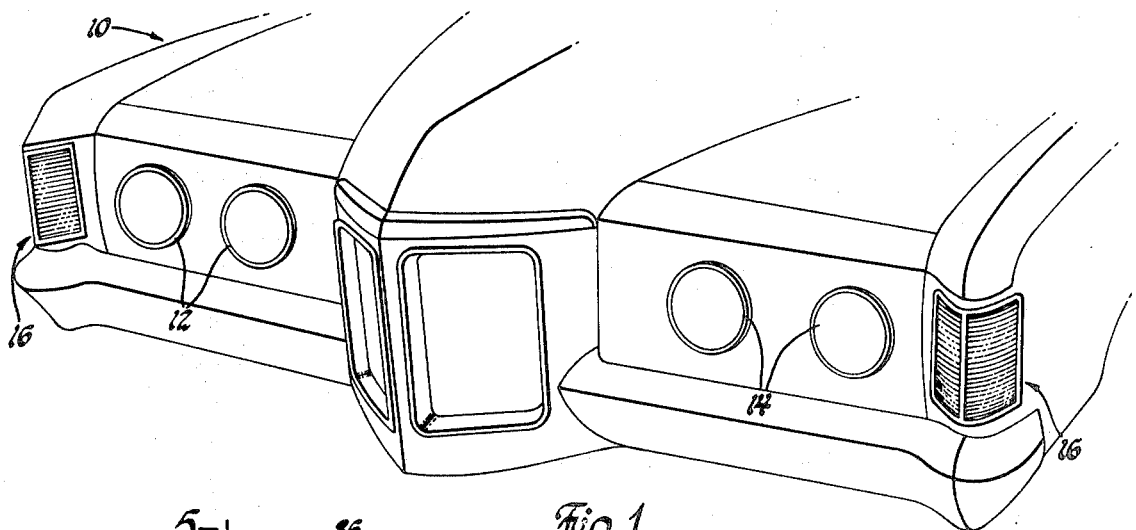
FIG. 1 is a fragmentary view of the motor vehicle incorporating a lamp assembly made in accordance with the present invention.
Figure 2:
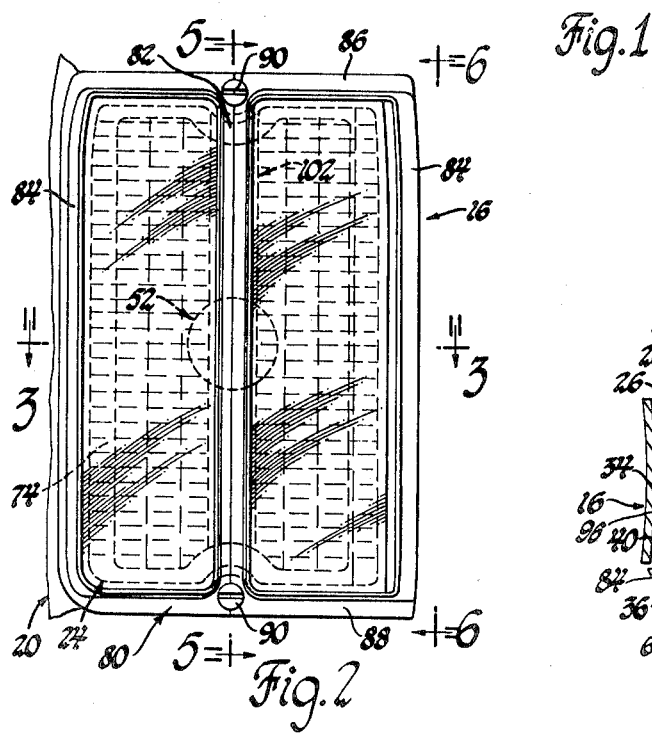
FIG. 2 is an enlarged front view of the lamp assembly shown in FIG. 1.

Referring to FIG. 1, a motor vehicle 10 includes pairs of headlamps 12 and 14 symmetrically disposed on opposite sides thereof. The headlamps 12 and 14 function as a conventional four-lamp system to provide high beam and low beam illumination. A pair of multiple function lamp assemblies 16 are mounted on the frontal outboard corners of the vehicle 10. The lamp assemblies 16 serve to provide signaling and clearance functions as selectively illuminated under the control of the vehicle operator. Each lamp assembly 16 functions independently as a turn signal lamp to give a flashing warning light on the side of the vehicle toward which the turn will be made. Both lamp assemblies can also be simultaneously flashed "on" and "off" to function as a hazard warning lamp. In addition, the lamp assembly 16 functions as a clearance lamp when steadily illuminated to show the overall width of the vehicle and as a side marker lamp when steadily illuminated to indicate the overall length of the vehicle.

Referring to FIGS. 2 through 6, each lamp assembly 16 includes a housing 20, a light source 22, and a lens 24. The housing 20 may be molded from a suitable material such as metal or plastic and is adapted to be mounted on the vehicle in a vertical plane by suitable fasteners (not shown). The housing 20 includes a rectangular sidewall 26 and a rear wall 27 having a central aperture 28 formed therein. A forwardly projecting annular rim 30 is formed on the front surface of the rear wall 27. A forwardly opening peripheral channel 32 is formed in the housing 20 outwardly of the sidewall 26 and serves to locate and retain an elastomeric gasket 34.

Figure 5:
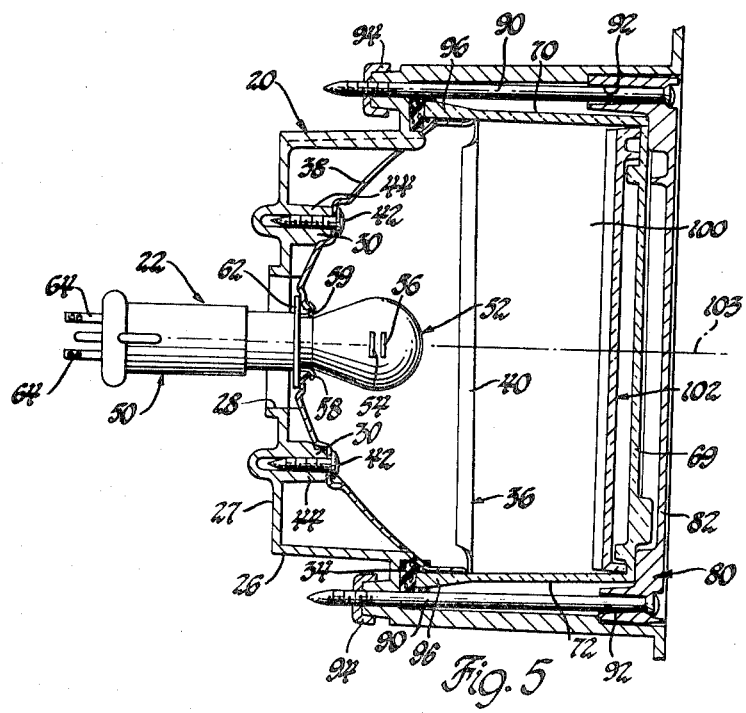
FIG. 5 is a view taken along line 5—5 of FIG. 2.
Figure 6:
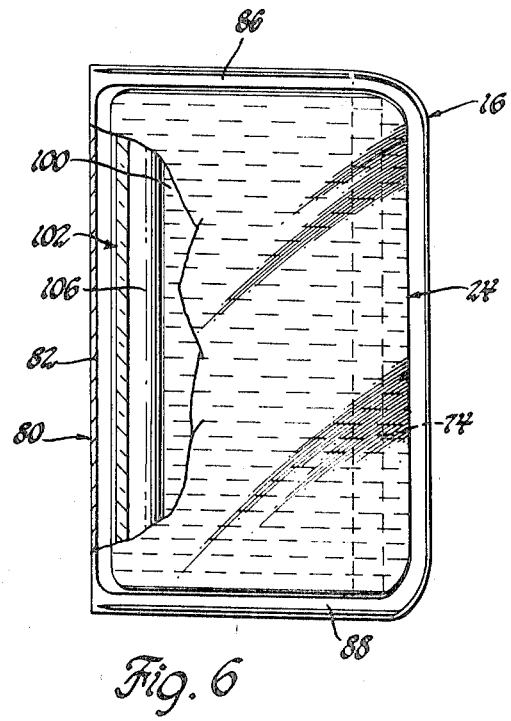
FIG. 6 is a partially sectioned view taken along line 6—6 of FIG. 2.

A metallic reflector 36 having a paraboloidal base 38 and a generally rectangular forwardly projecting shield 40 is positioned against the rim 30. In a conventional manner, the paraboloidal shape of the base 38 serves to collect and selectively redirect illumination from the light source 22. As seen in FIG. 5, a pair of fasteners 42 threaded into bosses 44 formed in the rear wall 27 adjacent the rim 30 serve to fixedly secure reflector 36 to the housing 20.

The light source 22 includes a socket 50 which receives, retains, and positions an amber colored lamp bulb 52 having a high intensity major filament 54 and a low intensity minor filament 56. The socket 50 includes a plurality of circumferentially spaced resilient fingers 58 which extend through an opening 59 formed in the base 38. The fingers 58 engage the edge of the opening 59 and serve to bias an annular flexible lip 62 of the socket 50 against the rear surface of the base 38 to provide a watertight seal at the rear of the lamp assembly 16. A pair of terminals 64 are respectively electrically connected to the filaments 54 and 56. Conventional switching and circuitry serves to selectively energize the filaments 54 and 56 in a predetermined manner.

The lens 24 is formed of a transparent material such as crystal plastic and is generally V-shaped when viewed in a horizontal plane. The lens 24 includes a vertically convex inboard portion 66 and an outboard portion 68 which are separated by a frontal rib 69, and substantially planar top and bottom surfaces 70, 72. The inboard and outboard portions 66 and 68 include optical flutes 74 for selectively controlling illumination from the filaments 54 and 56. A metallic bezel 80 having a central bar 82, side bars 84, and top and bottom flanges 86 and 88 engages the front surface of the lens 24.

A pair of fasteners 90 extend through openings 92 in the flanges 86 and 88 and are threaded through sheet metal fasteners 94 which are secured to the rear wall 27 of the housing 20. By tightening the fasteners 90, a rearward rim portion 96 of the lens 24 compressively engages the gasket 34 to form a dust and watertight seal between the lens 24 and housing 20 and in combination with the seal provided by the lip 62 establishes a sealed lamp envelope 100.

A side marker mirror 102 is located interior of the lamp envelope 100 and vertically centered with respect to the light source 22 and a horizontal plane 103, as seen in FIG. 5. The mirror 102 is formed of an acrylic plastic material and is fixedly secured at the top and bottom ends thereof to the rib 69 by a suitable means such as sonic welding. The mirror 102 includes an arcuate cylindrical portion 104 having an aluminized reflecting surface 106.

Figure 3:
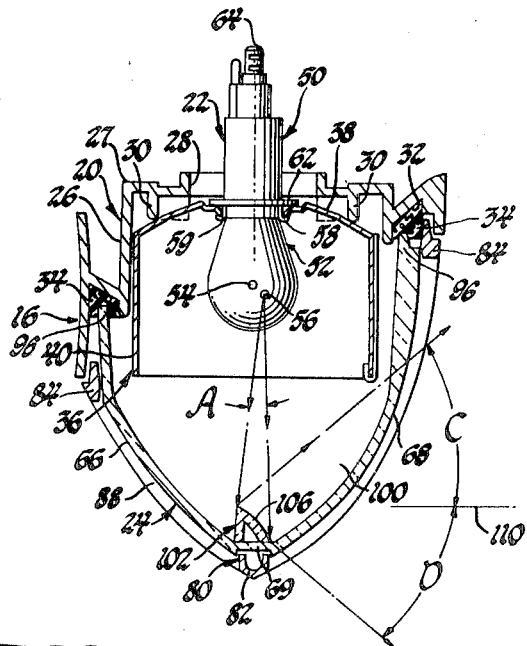
FIG. 3 is a view taken along line 3—3 of FIG. 2.
Figure 4:
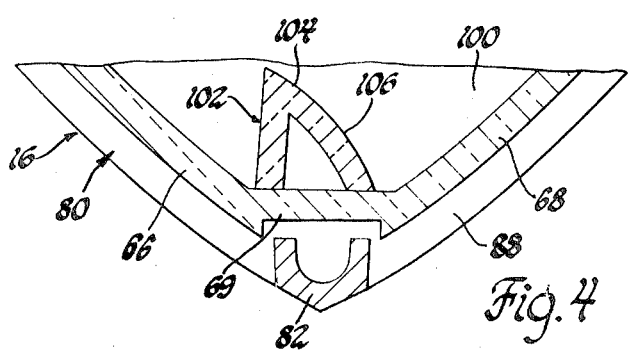
FIG. 4 is an enlarged view of a portion of FIG. 3 showing the integral side marker mirror.

As shown in FIG. 3, the reflecting surface 106 is positioned with respect to the filament 56 so as to intercept predetermined amount of illumination as designated by the subtended angle "A." The illumination intercepted by the reflecting surface 106 is redirected thereby outwardly of the lamp assembly 16 into the side marker illumination area. More specifically, the reflecting surface 106 is located with respect to a transverse vertical plane 110 so as to rearwardly direct a portion of the illumination through an angle "C" and forwardly direct a portion of the illumination through an angle "D" to an extent consistent with existing requirements for side marker lamps. The mirror 102 also distributes illumination outwardly above and below the horizontal plane 103.

The lamp assembly 16 herein described has been successfully found to meet existing side marker lamp standards by distributing a minimum of 0.25 candlepower 45° rearwardly and forwardly of the vertical plane 110 and 10° above and below the horizontal plane 103.

In operation, when it is desired to indicate the turning or hazard warning operating mode of the lamp, the major filament 54 is intermittently energized to provide the appropriate high intensity flashing sequence. To operate as a clearance or parking and side marker lamp, the minor filament 56 is steadily energized whereupon the major portion of the illumination is directed forwardly through sections 66 and 68 of the lens and the remaining portion is directed outwardly thereof so as to provide side marker illumination. The multiple function lamp assembly described above is equally adaptable for use on the rear of the vehicle to function as a combination taillight, turn signal, and side marker lamp with appropriate care being taken to vary the intensity of the filament and shape and location of the mirror 102 to comply with the applicable rear lighting standards.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A parking, turn signal, and side marker lamp assembly for a motor vehicle comprising: a housing adapted to be vertically mounted at a frontal corner of the vehicle; a transparent lens secured to said housing and defining therewith a lamp envelope; an electrical socket mounted on said housing; a light bulb carried by said socket, said light bulb having a first filament which is intermittently energized so as to function as a signal lamp and a second filament which is steadily energized for transmitting illumination outwardly of said lens to function as a parking lamp; an elongated mirror having an arcuate cylindrical reflecting surface, said mirror being vertically disposed in said lamp envelope and fixedly secured to an interior frontal surface of said lens, said reflecting surface being positioned with respect to said light bulb so as to intercept a predetermined portion of the illumination projected by said second filament and reflect the same outwardly to the side of the vehicle to thereby function as an integral side marker lamp.

2. A parking, turn signal, and side marker lamp assembly for a motor vehicle comprising: a housing adapted to be vertically mounted at a frontal corner of the vehicle; a generally V-shaped transparent lens secured to said housing and defining therewith a sealed lamp envelope, said lens having an outboard portion and an inboard portion; a reflector attached on said housing interior of the lamp envelope; a light source including a light bulb mounted on said reflector, said light bulb having a high intensity major filament and a low intensity minor filament, said major filament adapted to be intermittently energized for projecting illumination forwardly through said lens to function as a turn signal or hazard warning lamp, said minor filament adapted to be steadily energized for projecting illumination through said inboard portion and said outboard portion of said lens to function as a parking or clearance lamp; an elongated mirror fixedly secured to an interior surface of said lens between said inboard portion and said outboard portion, said mirror having an arcuate cylindrical reflecting surface vertically centered with respect to said lamp bulb and positioned with respect to said minor filament so as to intercept a portion of the illumination from said minor filament and reflect the same laterally outwardly of the vehicle through the outboard portion of said lens so as to function as an integral side marker lamp.

3. A multiple function lamp assembly for a motor vehicle comprising: a housing adapted to be mounted at a corner of the vehicle; a light source carried by said housing, said light source having a first filament adapted to be steadily energized for providing a clearance lamp function and a second filament adapted to be intermittently energized for providing a signal lamp function; a transparent lens mounted on said housing in front of said light source; and an elongated mirror element vertically carried on an interior surface of the lens, said mirror element having a reflecting surface of the lens, said mirror element having a reflecting surface positioned so as to intercept a portion of the illumination projected by said first filament and redirect the same outwardly through said lens into a predetermined area transverse to the direction of vehicle travel whereby the illuminated lamp assembly provides an indication of an extreme edge of the vehicle and, in combination with other lamp assemblies, a visual indication of the overall length and width of the vehicle.